A. H. MILLER AND R. E. McCAFFREY.
GAGE OR INDICATOR FOR FLUID HOLDING TANKS.
APPLICATION FILED DEC. 6, 1917.
1,396,273.
Patented Nov. 8, 1921.
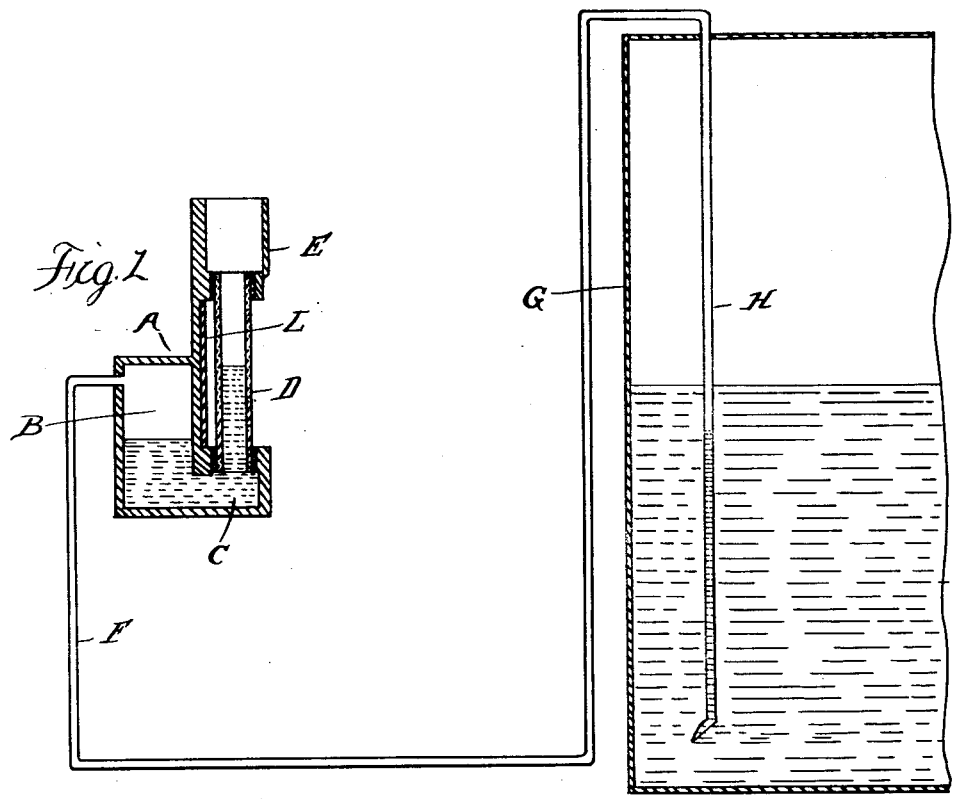
Inventor
Andrew H. Miller
Robert E. McCaffrey
By Whittemore Hulbert & Whittemore
Attorneys

UNITED STATES PATENT OFFICE.

ANDREW H. MILLER AND ROBERT E. McCAFFREY, OF DETROIT, MICHIGAN.

GAGE OR INDICATOR FOR FLUID-HOLDING TANKS.

1,396,273.  Specification of Letters Patent.  Patented Nov. 8, 1921.

Application filed December 6, 1917. Serial No. 205,722.

*To all whom it may concern:*

Be it known that we, ANDREW H. MILLER and ROBERT E. McCAFFREY, citizens of the United States of America, residing at Detroit, in the county of Wayne and State of Michigan, have invented certain new and useful Improvements in a Gage or Indicator for Fluid-Holding Tanks, of which the following is a specification, reference being had therein to the accompanying drawings.

The invention relates to indicators or gages for fluid holding tanks, such as the fuel tanks and oil reservoirs of internal combustion engines used on motor vehicles, and it is the object of the invention to provide a simple means of indicating at a point more or less remote from the tank the quantity of liquid contained therein. It is a further object to obtain a construction in which the indicator is self-correcting each time the tank is emptied or nearly emptied of its contents, and with these objects in view the invention comprises the construction as hereinafter set forth.

In the drawings:

Figure 1 is a vertical central section through the indicator, diagrammatically showing the same in connection with the liquid-holding tank;

Fig. 2 is a front elevation of the indicator; and

Fig. 3 is a diagram illustrating the operation.

In the operation of motor vehicles it is always desirable to leave a small quantity of the liquid fuel in the tank as a reserve. It is therefore quite common in the use of gages for indicating the quantity of liquid in the tank to have them set so as to indicate an empty tank while this reserve quantity is still contained therein. With the present construction the indicator is designed to also leave a reserve in the tank, but provision is made for calling attention to the fact whenever the reserve supply is being drawn upon.

The principle involved in the construction is the raising or lowering of a column of liquid in an indicating tube proportionately to the rise or fall of the liquid level in the tank. This is accomplished by extending a conduit downward in the tank and connecting the opposite end of said conduit with a chamber in which a fluid is entrapped and from which it is expelled by a rising pressure into the indicator tube. The length of the indicator tube may be restricted to any extent desired, and a substantially correct indication is made by properly proportioning the area of the tube immersed in the tank to the area of the indicator tube.

As shown, A is a suitable fitting having formed therein a chamber B communicating at its lower end with a lateral passage C which is connected with the transparent gage tube D. The upper end of this tube is preferably connected with a cup or receptacle E which is open to the atmosphere. F is a conduit connected to the upper portion of the chamber B and extending to the tank or other receptacle G containing the liquid, the level of which the gage is to indicate. The conduit F enters the upper portion of the tank G and extends downward therein, but terminates a sufficient distance from the bottom to leave the desired reserve quantity when the lower end of said pipe is unsealed.

Within the tube D and chamber B is placed a small quantity of fluid, such as oil, the normal level of which when the pressure in the chamber B is at atmosphere being at the lower end of the tube or the zero marking thereon. When, however, the receptacle G is filled with liquid this will rise through the depending portion H of the conduit F and in so doing will create an air pressure within the tube F greater than atmospheric. This will displace fluid from the chamber B and cause it to rise in the indicator tube D, the rise being proportionate to the rise in the tank. In the same manner the lowering of the level in the tank will produce a corresponding lowering of the column in the tube, and when the lower end of the tube H is unsealed the fluid in the tube will be at its original level.

It is most essential that the indicator should accurately register when the tank is nearly empty and the drawing upon the reserve is begun. This is accomplished by the unsealing of the lower end of the tube H, which immediately drops out any liquid contained therein and permits atmospheric pressure to be restored in the chamber B. Thus if through any change in temperature the air within the conduit F and chamber B is either contracted or dilated so as to produce a slightly inaccurate registration in the tube D, this is at once corrected when the tube H is unsealed. The operator's attention is further directed to this unsealing of the tube by the sudden dropping of liquid in the gage tube D, and in the same manner the sealing of the lower end of the tube H will at once cause a sudden rise in the tube D. Thus, as indicated in Fig. 3, the end I of the tube F is just sealed and the level of the liquid in the tube D stands at J which is slightly above the line K—K, indicating the normal level when the tube I is unsealed. The reason for this is the capillary action which is greatest in the tube H, this being of small diameter and which will cause the liquid to rise a short distance therein as soon as the lower end is in contact with the surface of the liquid in the tank. This, in turn, will increase the pressure upon the air in the tube F and the chamber B in communication therewith and will cause a rise in the tube D. On the other hand, when the tube H is unsealed and particularly where the lower end thereof is slightly enlarged and obliquely cut off, all of the liquid in the tube will run out, which by restoring atmospheric pressure will permit the liquid in the tube D to suddenly fall.

As the liquid is raised in the tube D the hydrostatic pressure of this liquid column will react upon the air within the chamber B and also upon the liquid within the tube H tending to depress the level thereof below the general level in the tank. Thus the movement of the liquid column in the tube D for each succeeding gallon of liquid in the main tank will be progressively less, as more work is required to elevate the column. If it is desired to exactly indicate the quantity of liquid in the tank this may be done by suitably calibrating the tube D,—also by tapering the tube H so as to be of increasing cross-section as it extends upward, as shown in Fig. 3, the hydrostatic pressure of the column in the tube D may be compensated for and substantially uniform gradations used for indicating the quantity. For an indicating tube D of fixed height and diameter, the taper of the tube H will depend upon its proportions which must be determined by the height of the tank G. Thus for a shallow tank G a short tube H of comparatively large diameter and considerable taper would be used while if the tank G were deep, the tube H would be correspondingly long and of a lesser diameter and decreased taper.

We also preferably employ a pair of gage indicators D and D' arranged on a common mounting and used respectively for indicating the fuel and the lubricating oil. These may be mounted upon the dash or other convenient position in the motor vehicle, to be under observation of the driver, and will at all times indicate the condition of the fuel and lubricating systems.

In order that the gage may be read in the dark as well as in daylight, we preferably place in proximity thereto a radiant or luminous element. As shown, L is a plate or disk having luminous surface, which is insertible in rear of the tubes D and between the nipples to which they are connected at their upper and lower ends. If desired, the indications or scale markings may be also placed on this member, or they may be placed on the tube and read from the light radiating from the element.

What we claim as our invention is:

1. The combination with a liquid container, of an indicator therefor comprising a tube extending downward in said container and having its lower end open, the plane of the opening being oblique to the tube, the opposite end of said tube extending to the point where the indicator is to be located, a receptacle for indicating fluid having a sealed air chamber therein connected with said tube, and a transparent tube rising from said receptacle having its lower end immersed in the fluid therein.

2. The combination with a liquid container, of an indicator therefor comprising a tube extending downwardly within said container, the diameter of said tube being gradually increased from its lower to its upper portion, a substantially U-shaped container forming a receptacle for indicating fluid, and a tubular connection between one leg of said U-shaped container and the upper end of the tube of varying diameter.

In testimony whereof we affix our signatures.

ANDREW H. MILLER.
ROBERT E. McCAFFREY.